March 18, 1952  C. M. MARTIN  2,589,718
STACKING APPARATUS
Filed Oct. 11, 1948  3 Sheets-Sheet 2

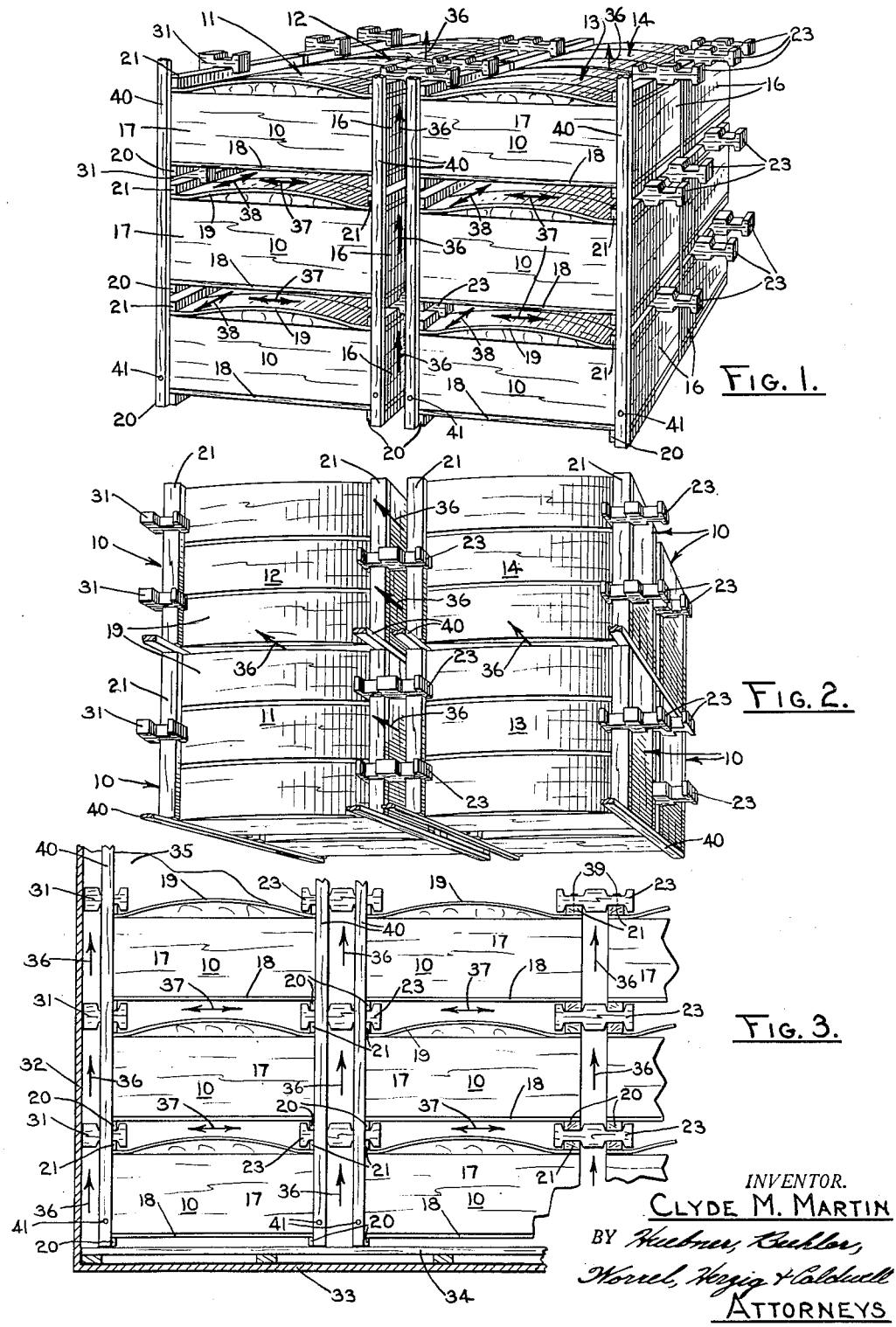

INVENTOR.
CLYDE M. MARTIN
BY Huebner, Beehler,
Worrel, Herzig & Caldwell
ATTORNEYS March 18, 1952 C. M. MARTIN 2,589,718
STACKING APPARATUS
Filed Oct. 11, 1948 3 Sheets-Sheet 3

INVENTOR.
CLYDE M. MARTIN
BY
ATTORNEYS

Patented Mar. 18, 1952

2,589,718

UNITED STATES PATENT OFFICE 2,589,718

STACKING APPARATUS

Clyde M. Martin, Orange Cove, Calif., assignor of one-half to Nick J. Buratovich and one-half to Mike T. Buratovich, Dinuba, Calif.

Application October 11, 1948, Serial No. 53,858

12 Claims. (Cl. 105—369)

The present invention relates generally to a stacking method and apparatus for the stabilization of boxed produce arranged in stacks, as for example in railway cars for shipping, and more particularly to a method and apparatus for integrating boxes in a load assembly in a manner dependably retaining the boxes in arranged position and assuring the proper ventilation of produce contained therein.

In the marketing of fresh produce, such as fruits and vegetables, it is the usual practice to load the produce in boxes of uniform size and shape, to lid the boxes, and then to stack the boxes in a carrier, such as a refrigerated railway car, for shipment. Originally the boxes were arranged in stacks and the stacks loaded in end to end arrangement in a tier across the car, successive tiers disposing the boxes in side by side relation in rows lengthwise of the car, adjacent boxes being in abutting relation. It was found that under such loading practices and excessive amount of spoilage of the produce occurred during shipment.

It is well known that fresh produce continues to breathe for a considerable time after the harvesting thereof and that such breathing is essential to the maintenance of the produce in a marketable condition. This necessitates thorough ventilation of load assemblies. Further, it is normally necessary to cool the produce for shipment. This is usually done by shipping the produce in refrigerated cars which are usually pre-cooled prior to the sealing thereof for movement to market. The pre-cooling procedure normally takes the form of blowing cold air from an independent source through the car. It will be obvious that efficient pre-cooling of the car and efficient continued refrigeration of produce arranged therein can only be achieved in a load assembly that permits ready ventilation. Still further, in many types of produce it is desirable, and in some instances necessary, to fumigate the produce after it is packed and before shipment. The fumigation is more effectively carried on in the car after the loading thereof than at any other stage of the packing and shipping procedure. Obviously the fumigation, if it is to be effective and not unduly protracted, requires a load assembly subject to ready ventilation.

Because of these requirements, the method of loading the cars previously described has been abandoned in commercial carloading procedures involving fresh produce. Much experimentation and development work has been done to the end of solving the problems of arranging the boxes of produce in a load assembly in a manner that will dependably maintain the boxes in arranged position during transportation, that is economical and easy to employ, and that assures efficient ventilation of the car to the end of permitting the produce to continue to breathe, rapidly to pre-cool and efficiently to refrigerate the produce during transportation, and/or to facilitate fumigation of the produce of the load assembly.

An object of the present invention is to provide an improved loading method and apparatus.

Another object is to provide a load assembly that possesses improved ventilation characteristics.

Another object is to provide a load assembly having intersecting ventilation passages formed therethrough in substantially horizontal planes intermediate the stacked boxes and in substantially vertical planes intermediate stacks of the boxes.

Another object is to provide a load assembly that is easy to employ, inherently economical, and dependable in assuring effective ventilation and maintenance of the boxes in predetermined positions.

Another object is to provide an improved spacer for boxes and the like.

A further object is to provide spacers for boxes and the like that are suited to automatic machine tool formation to the end of reducing the production cost thereof.

A still further object is to provide improved spacers of such compact form as to make it practical to retrieve the spacers when a load of produce is taken from a railway car and to return the spacers for repeated use.

Other objects and advantages will become apparent in the subsequent description in the specification.

Referring to the drawing:

Fig. 1 is a perspective view of a portion of a load assembly embodying the teachings of the present invention as viewed from the side thereof.

Fig. 2 is a perspective view of the portion of the load assembly shown in Fig. 1 viewed generally from the top thereof.

Fig. 3 is a fragmentary transverse sectional view of a refrigerated railway car showing a portion of a load assembly of the present invention contained thereby.

Figure 4:
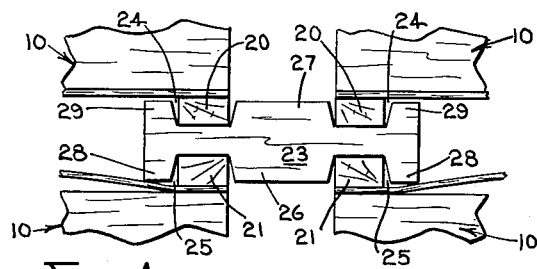
Fig. 4 is a somewhat enlarged side elevation of a spacer of the present invention shown in association with four fragmentarily illustrated boxes with which it is employed to support the boxes in vertically spaced relation and corresponding boxes of adjacent stacks in horizontally spaced relation.

Referring in greater detail to the drawings:

A representative portion of a load assembly of the present invention is shown in Figs. 1 and 2 including a pluraltiy of boxes 10 arranged in stacks designated generally at 11, 12, 13, and 14 respectively. When loaded in a railway car, the stacks 11 and 12, and 13 and 14 normally comprise rows longitudinally of the car and the stacks 11 and 13, and 12 and 14 comprise tiers transversely of the car. It is to be understood that the boxes are stacked much higher than shown and that a sufficient number of tiers and rows are employed substantially to fill a railroad car or other confining and transporting apparatus. It is also to be understood that the boxes may be arranged in end-to-end relation in the rows, rather than in end-to-end relation in the tiers, without departing from the spirit or the scope of the present invention.

The boxes 10 are of a well known rectangular form having relatively heavy, spaced ends 16, spaced sides 17, a bottom 18, and a lid 19 secured in an upwardly arched position after the box has been packed with produce. The boxes are normally formed of wood and the bottoms each provided with a pair of spaced, transversely arranged, cleats or ledges 20 adjacent the ends thereof and the lids each provided with a pair of spaced, transversely arranged, cleats or ledges 21 adjacent the ends of the box and nailed to said ends in securing relation to the lid. As will subsequently become apparent the load assembly and apparatus of the present invention is not restricted to the type of boxes described and shown in Figs. 1, 2, 3, 4, 6, 8, and 10 but suitably illustrated thereby. The present invention may employ boxes having either or both upwardly and downwardly extended cleats or other extensions. The spacers may even be employed with open top boxes by grasping the upper edges of the ends of the boxes instead of the box cleats.

Figure 5:
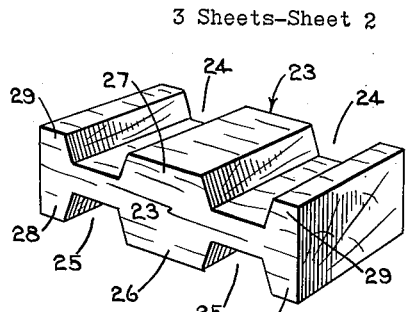
Fig. 5 is a perspective view of the spacers shown in elevation in Fig. 4.

Spacers 23 shown in Figs. 1, 2, and 3 are illustrated in greater detail in Figs. 4 and 5. The spacer is conveniently formed from a substantially rectangular, horizontally positioned, block of wood or other suitable material and has a pair of substantially parallel, spaced channels or grooves 24 formed upwardly disposed in the top surface thereof and a pair of substantially parallel, spaced, downwardly disposed grooves 25 formed in the lower surface of the block. The grooves are of a size to receive individually the cleats 20 and 21 of the boxes with which the spacer is employed. It has been found desirable to provide the grooves with inwardly converging side walls to facilitate speedy placement of the spacers as a load is assembled. So shaped, the spacer 23 provides a downwardly disposed boss 26 and an upwardly disposed boss 27 adapted snugly to fit in the interstices between the ends of the boxes and a pair of spaced, downwardly extended bosses 28 and a pair of spaced, upwardly extended bosses 29 spaced from the central bosses 26 and 27, respectively, a sufficient distance to receive the cleats therebetween.

Figure 6:
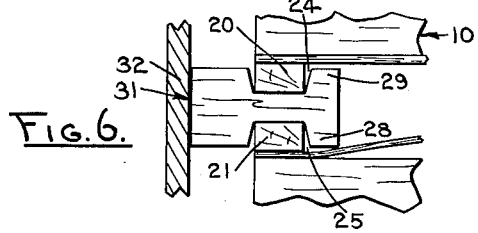
Fig. 6 is a side elevation of a so-called half-spacer of the form shown in Figs. 4 and 5 employed to space a pair of adjacent boxes in a stack and said stack from the ends of the railway car or other load-confining structure.
Figure 7:
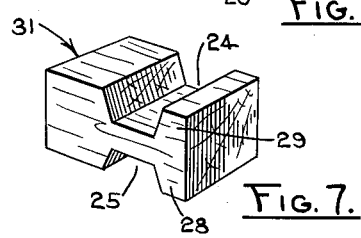
Fig. 7 is a perspective of the half-spacer of Fig. 6.

A so-called half-spacer 31 is shown in detail in Figs. 6 and 7 of the general type of the spacer 23. The half-spacer is adapted to rest upon a supporting box and to support a superimposed box and to space said boxes from an adjacent wall, such as a side wall 32 of a railway car or other confining structure. The spacer 31 is the spacer 23 vertically bisected through the bosses 26 and 27 and thus has a single downwardly disposed channel 25 and a single upwardly disposed channel 24 for the receipt of the cleats 20 and 21, respectively.

A portion of a load assembly is shown in Fig. 3 arranged in a railway car having a side wall 32 and a floor 33. The floor is normally provided with supporting slats 34 upwardly spaced from the floor 33 and adapted to support the load assembly. The slats are spaced from the floor for the free circulation of cool air, fumigation gases and the like between the floor and the slats and the slats spaced so that said air and/or gases may pass freely upwardly through their interstices. An end wall of the railway car is shown fragmentarily at 35 in Fig. 3.

The bottom box of each stack is rested upon the slats 34, and is spaced upwardly therefrom by its lower cleats 20. The row of boxes adjacent the side wall 32 of the railway car is spaced therefrom by the use of the spacers 31, such spacers being provided between each box in each stack of said tier and extended therefrom to abutment with the wall 32. As the load is assembled, the spacers 31 are arranged so that each receives an upwardly disposed cleat 21 of the box on which it is rested and the downwardly disposed cleat 20 of the box rested on the spacer. Thus the half spacers lock their respective boxes against longitudinal movement from vertical alignment in the stacks. The spacers 23 are interposed superimposed corresponding boxes of adjacent stacks and by the reception of the cleats 20 and 21 of the four boxes, which each cleat 23 interconnects, locks the superimposed boxes in vertical alignment, vertically spaces the boxes in the stack for free ventilation, fumigation, and the like and interconnects the adjacent stacks in a row in fixed spaced relation. Each box in each stack above the bottom box is supported at one end by a single spacer (23 or 31) and at the opposite end by a pair of spacers. The ends of boxes supported by a single spacer have a pair of spacers rested thereon to support superimposed boxes and the opposite ends each have a single spacer rested thereon to support superimposed boxes. This relationship is clearly evident in Figs. 1 and 2 and through the provision of three point support for each box supported by a spacer dependably holds said boxes without rocking or tipping movement. It will be apparent that a greater number of spacers may be employed but three point support has been found excellently to accomplish the purposes.

As each tier of boxes is formed by a plurality of complete stacks of boxes positioned in end-to-end relation transversely of the railroad car or other carrier, a pair of wooden strips 40 is located at the outwardly disposed side of each stack of boxes adjacent the ends of the boxes in each stack and nailed at 41 at a plurality of locations into the boxes. Thus the individual boxes in each stack with a plurality of spacers 23 and 31 therebetween are held unitarily in fixed vertical relation whereby they cannot become inadvertently separated during the transportation thereof. The strips are nailed against the exposed side of each tier of boxes as said tiers are arranged across the width of the car. The strips in practice are nailed only to the bottom box and to the top box in each stack but may be nailed to most or all of the boxes, if desired. Each stack of boxes is thus held unitarily along one side thereof. Although the strips are shown and described as constructed of wood, it is obvious that they may be made of fibreboard, plastic, strips of sheet metal, or any material with sufficient tensile strength to prevent the boxes from moving relatively vertically in the stack.

Although the top layer of boxes in the stacks do not support additional boxes thereof, the spacers 23 and 31 may be conveniently employed to lock the stacks in spaced relation. Inasmuch as no weight is exerted downwardly on the top spacers to maintain them in place, the spacers on the top cleats 21 of the top boxes may be nailed into position as at 39 in Fig. 3. The top of the load may also be secured in horizontal arrangement by overlaying the same with car strips and nailing the car strips into place. The spacers, however, are superior to the car stripping of the top layer in that they do not overlay the upwardly arched portion of the lids and thus exert no crushing effect upon produce packed in the boxes. The bosses upwardly extended from spacers employed above the top layer have no function, thus the spacers 23 and 31 may have such bosses removed for this purpose, if desired.

The load assembly of the present invention permits the ready vertical movement of the air, fumigation gases and the like between the ends of boxes arranged in tiers and between the sides of boxes arranged in rows, as demonstrated by the arrows 36 in Figs. 1, 2, and 3. The spacers in combination with the cleats space the boxes for free movement of such air and/or gases longitudinally of the boxes in the stacks, as indicated by the arrows 37, and transversely of the stacks as indicated by the arrows 38. The load assembly is dependably maintained in position by the interlocking of the spacers with the box cleats with the stacks spaced in the rows, the boxes spaced in the stacks, and the produce assured dependable support, complete and efficient pre-cooling, effective refrigeration, and convenient and speedy fumigation. The nailing of the strips 40 to the sides of the boxes in the stacks not only maintains the boxes in fixed vertical relation against any bumping of the car, but further serves to maintain the spacers in place and provides vertical ventilation passages along the sides of the boxes in communication with the vertical passages at the ends of the boxes and the horizontal passages between the boxes in the stacks.

*Second form of spacer*

Figure 8:
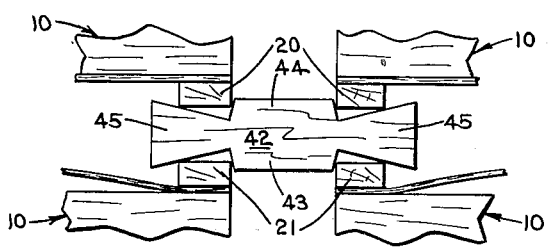
Fig. 8 is a side elevation of a modified form of the spacer of the present invention shown in association with four fragmentarily illustrated boxes with which it is employed to support the boxes in vertically spaced relation and corresponding boxes of adjacent stacks in horizontally spaced relation.
Figure 9:
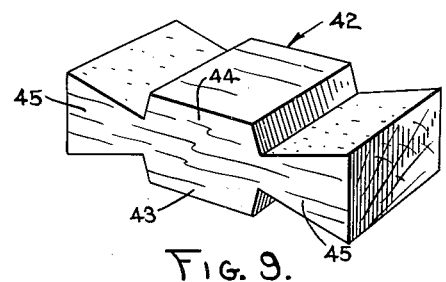
Fig. 9 is a perspective view of the spacer shown in Fig. 8.

A second form 42 of the spacers of the present invention is illustrated in Figs. 8 and 9. As in the case of the spacers 23 the spacers 42 are formed of substantially rectangular blocks of wood, or other suitable material. Said spacers provide downwardly extended bosses 43 and upwardly extended bosses 44 at their central portions adapted snugly to fit in the interstices of adjacent stacks of boxes. Said bosses have spaced outwardly converging side walls, such as the bosses 26 and 27 of the spacer 23 to facilitate placing of the spacers. A pair of substantially horizontal, wedge-shaped portions 45 are laterally extended from the central portion of the spacer 42 and have thickened outer end portions. As shown in Fig. 8, the spacer 43 receives the cleats 20 and 21 of the boxes between the thickened end portions of the wedge-shaped extensions and the central bosses and interconnects pairs of boxes in a stack in fixed vertically spaced relation and corresponding pairs of boxes in adjacent stacks in horizontal spaced relation. The inwardly converging wedge portions 45 tend to move the boxes having cleats abutting thereagainst toward the central portion of the spacer 42 and thus, even if jostled during shipment, the boxes are dependably maintained in position and spaced for ventilation, fumigation, and the like, as described for the spacers 31.

Figure 10:
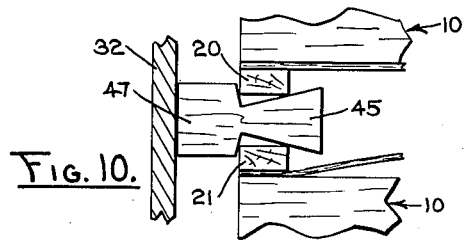
Fig. 10 is a side elevation of a so-called half-spacer of the form shown in Figs. 8 and 9 as employed to space a pair of adjacent boxes in a stack and said stack from the ends of the railway car or other load-confining structure.

A so-called half-spacer 47 is shown in Fig. 10 which comprises a spacer 42 bisected through the bosses 43 and 44. The half-spacer 47 is employed much in the manner of half-spacer 31 and thus is not described in further detail.

*Third form of spacer*

Figure 11:
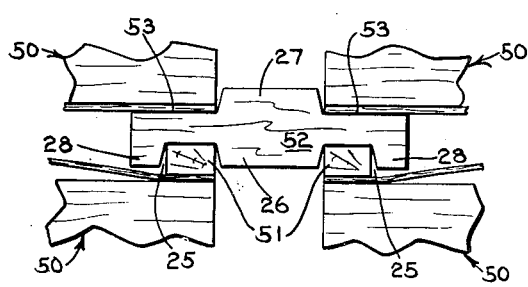
Fig. 11 is a side elevation of a form of the spacer of the present invention modified to accommodate boxes having no bottom cleats, shown in association with four fragmentarily illustrated boxes with which it is employed to support the boxes in vertically spaced relation and corresponding boxes of adjacent stacks in horizontally spaced relation.
Figure 12:
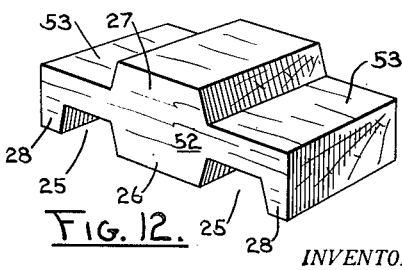
Fig. 12 is a perspective view of the spacer shown in elevation in Fig. 11.

Some types of boxes employed in the shipment of produce do not have bottom cleats. Such boxes are fragmentarily shown at 50 in Fig. 11 having upwardly disposed cleats 51 in securing relation to the lids in the manner described for cleats 21. When such boxes are employed in the load assembly of the present invention a modification in the spacer is required. Such a modified spacer is shown generally at 52 in Figs. 11 and 12. The spacer 52 takes the form of the spacer 23, already described, but does not have the upwardly extended bosses 29. Thus the spacer 52 includes the downwardly extended central boss 26, the upwardly extended central boss 27, the downwardly disposed spaced channels 25 and the spaced downwardly extended bosses 28 of the spacer 23. The removal of the upwardly extended bosses 29 provides the boss 52 with substantially horizontal box supporting surfaces 53 at each side of the boss 27. In use the spacers interconnect supporting boxes by being rested upon adjacent ends of boxes in adjacent stacks and by the reception of the cleat 51 of said boxes in the grooves 25. Superimposed boxes are rested upon the surface 53 and are spaced from the supporting boxes by the spacer and the adjacent stacks spaced by bosses 26 and 27.

Figure 13:
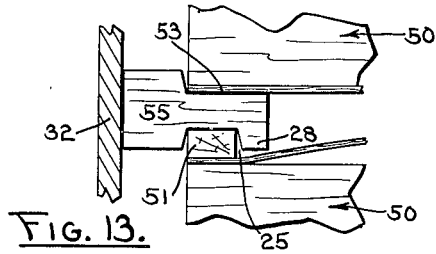
Fig. 13 is a side elevation of a so-called half-spacer of the form shown in Figs. 11 and 12 as employed to space a pair of adjacent, fragmentarily illustrated, boxes in a stack and said stack from the ends of the railway car or other load-confining structure.

In Fig. 13, a half-spacer 55 of the type designated 52 is shown comprising a spacer 52 bisected centrally through the bosses 26 and 27. The half-spacer 55 is employed much in the manner of the half-spacers 47 and 31 to space vertically superimposed boxes in a stack and to space the stacks from an adjacent wall of a confining railway car or the like.

Although the spacers have been shown and described as formed from wooden blocks it is believed to be within the scope of this invention to form the spacers from materials such as metal, plastic, or any other material that will maintain the desired shape or form for engaging and spacing purposes. It is also assumed that the blocks may be fabricated from a plurality of properly shaped individual blocks, nailed, glued or otherwise adhered together to obtain the described forms of spacer.

Alternate form of hold-down

Figure 14:
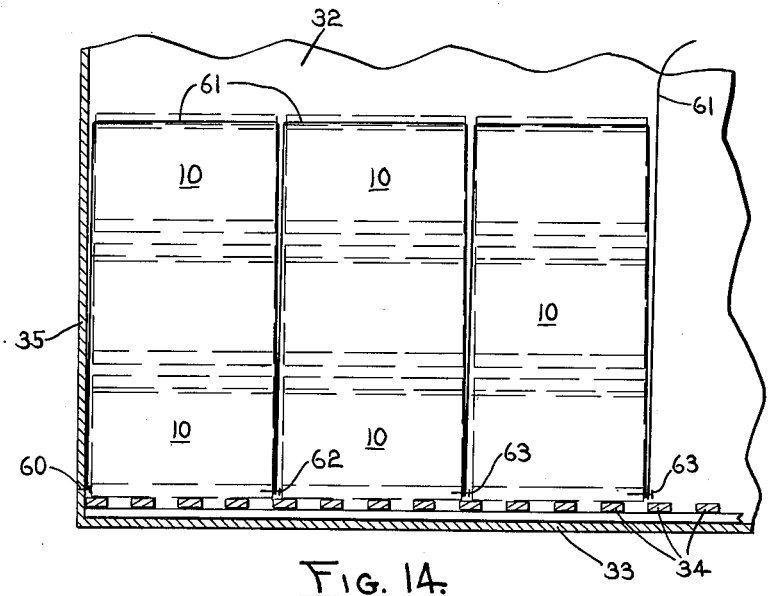
Fig. 14 is an elevational view of a portion of a load assembly showing a second form of maintaining each stack of superimposed loads in unitary relation in a compartment for transportation thereof.
Figure 15:
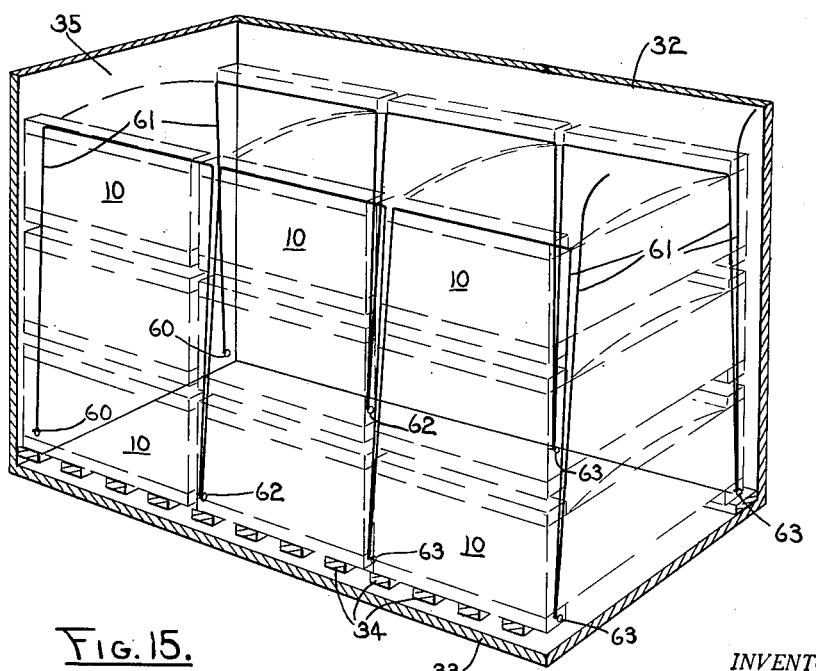
Fig. 15 is a perspective view of the means for maintaining stacks unitarily, as shown in Fig. 14.

As illustrated in Figs. 14 and 15, the plurality of boxes located in superimposed relation, forming a vertical stack may be held vertically in unitary relation by the flexible tension means shown. In this form, previously to a stack being formed adjacent the end wall 35 of a railway car, a pair of horizontally spaced nails 60 are driven into the end wall of the car adjacent the bottom thereof. Screws, bolts or the like anchoring means, may be substituted for the nails 45. A cord, wire, cable or other flexible tension means 61 is attached to each of the nails, as by tying one end thereof to the nails and driving the same home. Boxes or lugs are thereafter stacked adjacent the end wall of the car and the pair of nails, to the desired height. Another pair of nails, screws, bolts or like anchoring means 62 are attached to the bottom box near the bottom edge of the exposed side thereof. The pair of cords 61 are stretched upwardly along the rear side of the stacked boxes, forwardly over the top box and downwardly along the exposed side of the stack with each cord pulled tight and attached to one of the nails 62. This same procedure is followed in successive stacks in assembling a complete row of stacks against the end wall of the car, with the half-spacers 31 located between the side walls and each adjacent stack of boxes and the spacers 23 located between adjacent vertically positioned boxes maintaining the stacks in the rows in a spaced relation to each other as illustrated in Figures 1, 2 and 3.

A second row is formed adjacent the first row with each attack in the second row located in side by side relation to the stacks in the first row with the spacers 23 maintaining vertically adjacent boxes and adjacent tiers in spaced relationship. A pair of nails 63 or the like are driven into the exposed side of each lower box near the lower edge thereof and the pair of cords, located in substantial parallelism are brought upwardly along the rear side of each second stack, forwardly over the top box and downwardly along the exposed side of each second stack with each cord attached to the nails 63 of their respective stack. This procedure is repeated in assembling rows of boxes from both ends of the car until the center of the car is reached.

In the use of the described means for maintaining all of the stacks in unitary relation, the individual boxes in each stack are prevented from bouncing or raising relative to the other boxes in the stack. The first row of boxes adjacent the end of the car are held downwardly, being anchored to the end of the car, and the remainder of the rows are held downwardly by being anchored to bottom boxes in the stacks therein. Thus the entire carload of boxes is prevented from bouncing or shifting vertically relative to the car or to each other.

Operation

The operation of the load assembly of the present invention is clearly apparent and is briefly summarized at this point. A box of produce is rested in a position where it is desired to provide a stack of boxes in the load assembly. In a railway car, for example, this would normally be with an end of the box adjacent the side wall 32 of the car, and with a side of the box abutting an end wall of the railway car, the box being rested on the slats 34. When boxes providing both upwardly and downwardly disposed cleats are employed, half-spacers 31 or 47 are employed to space the box from side wall of the car. This is done by fitting the groove 25 of the spacer 31 over the upwardly disposed cleat 21 of the box with the boss 26 interposed the cleat and the side wall of the car. When the spacer 47 is employed it is rested on the cleat 21 between the thickened outer end of the wedge-shaped portion 45 and the boss 43 with said boss interposed the cleat and the side wall of the car. A second box is arranged in spaced end-to-end relation with the first box and a pair of the spacers 23 or 43 rested upon the cleats 21 of the adjacent ends of the boxes and receiving said cleats in the manner described for spacers 31 and 47.

The downwardly disposed cleats 20 of superimposed boxes are fitted into the channels 24 of the spacers 23 and 31, or when spacers 42 and 43 are employed, rested upon said spacers between the thickened end edges of the wedge-shaped portions and the central bosses. Thus each half-spacer vertically spaces a pair of superimposed boxes and horizontally spaces the ends of said boxes from the side wall 32, or other confining wall of the railway car or the like. Each of the spacers 23 and 42 interconnects four adjacent boxes, vertically spaces corresponding pairs of superimposed boxes in adjacent stacks, and horizontally spaces the stacks. As previously described, and as shown in Figs. 1 and 2, the boxes preferably are supported at one end by a single spacer and at the opposite end by a pair of spacers, the end of the box supported by a single spacer in turn supporting a pair of spacers and the end of the box supported by a pair of spacers in turn supporting a single spacer. Alternate adjacent ends of boxes in a tier in a given layer of boxes, employ single spacers and the intermediate adjacent ends of the boxes, pairs of spacers.

The spacers 52 and 55 are employed with boxes having no bottom cleats 21 in the general arrangement described for the cleats 23, 31, 42, and 47 but interlocking only the boxes on which they are rested. The spacers 52 space superimposed boxes from the boxes on which they are rested and corresponding boxes of adjacent stacks from each other. The half spacers 55 space superimposed boxes and the ends of the boxes from adjacent confining walls of the railway car.

As each vertical stack of boxes is completely stacked, usually terminating a distance from the top of the railway car in which they are located, a pair of spaced strips 40 is nailed to the exposed side thereof along the ends of the boxes. The strip is usually nailed only to the bottom and top box in a stack but may be nailed to most or all of the boxes. Thus the top box in each stack is located in a fixed relation above the bottom box with the intermediately spaced boxes fixedly positioned therebetween by the spacers.

The stacks may be maintained unitarily by the means shown in Figs. 14 and 15 in which a pair of cords 60 are anchored to the wall of the railway car and extend over an adjacent stack of boxes, being anchored to the bottom box of the stack at the side opposite to the wall. The cord continues over each next adjacent box and is anchored to the bottom box of each stack oppositely of the wall. Thus the top box in each stack is held downwardly maintaining the boxes of each stack in unitary relation.

The arrows 36, 37, and 38 clearly demonstrate the free movement of air, fumigation gases, or the like vertically between the stacks and horizontally between the boxes in the stacks. In actual practice the vertical passages serve to feed the passages between the boxes in each stack with refrigerated air, fumigation gas, or other gases desired to circulate through the load assembly in intimate contact with the boxed produce.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and structures.

Having described my invention, what I claim as new and desire to secure by Letters Patent is:

1. The combination of a plurality of boxes of substantially uniform shape arranged in stacks and the stacks arranged with the boxes in end-to-end relation in tiers, the individual boxes having cleats secured thereto disposed transversely of the tops of said boxes adjacent to the ends, and spacers adapted to hold the boxes in the stacks in vertically spaced relation and adjacent stacks in the tiers in horizontally spaced relation comprising elongated blocks positioned horizontally between and interconnecting corresponding boxes of adjacent stacks, said blocks being transversely grooved to receive the cleats of the corresponding boxes of adjacent stacks and providing spacing bosses integral therewith extended from the blocks between the ends of the boxes of adjacent stacks in the tiers.

2. The combination of a plurality of boxes of substantially uniform shape arranged in stacks and the stacks arranged with the boxes in end-to-end relation in tiers, the individual boxes having cleats secured thereto disposed transversely of the tops of said boxes adjacent to the ends, and spacers adapted to hold the boxes in the stacks in vertically spaced relation and adjacent stacks in the tiers in horizontally spaced relation comprising elongated blocks positioned between corresponding superimposed boxes of adjacent stacks, said blocks having a pair of substantially parallel, spaced grooves formed transversely of the block adapted to receive the cleats of adjacent boxes in adjacent stacks and upwardly and downwardly extended bosses centrally thereof positioned between the adjacent ends of the boxes of adjacent stacks.

3. The combination of a plurality of boxes of substantially uniform shape arranged in stacks and the stacks arranged with the boxes in end-to-end relation in tiers, the individual boxes having cleats secured thereto disposed transversely of the tops of said boxes adjacent to the ends thereof, and spacers adapted to hold the boxes in the stacks in vertically spaced relation and adjacent stacks in the tiers in horizontally spaced relation comprising elongated blocks positioned between superimposed boxes in the stacks and interconnecting corresponding boxes of adjacent stacks, said spacers having central downwardly extended bosses positioned between the adjacent stacks, central upwardly extended bosses positioned between said stacks, and pairs of downwardly extended bosses spaced on opposite sides of said central downwardly extended bosses distances sufficient to receive the box cleats therebetween.

4. In combination with a railway car, or the like, loaded with stacks of boxes of substantially uniform rectangular shape and size arranged in tiers with the boxes of adjacent stacks in spaced end-to-end relation, said boxes having transverse cleats adjacent to the ends thereof, spacing means interconnecting corresponding cleats of adjacent stacks in fixed spaced relation and interposed between corresponding boxes of said adjacent stacks, the spacing means having central boss portions upwardly and downwardly extended therefrom between the stacks, and bosses at the outer ends thereof spaced from the central boss portions to receive the cleats therebetween.

5. The combination of a plurality of substantially uniformly shaped boxes arranged in stacks and the stacks arranged with the boxes in end-to-end relation in tiers, the individual boxes having cleats secured thereto disposed transversely of the tops of said boxes adjacent to the ends thereof and cleats secured thereto disposed transversely of the bottom of said boxes adjacent to the ends thereof, and spacers adapted to support the boxes in the stacks in vertically spaced relation and to maintain adjacent stacks in the tier in horizontally spaced relation, the individual spacers each comprising an elongated block positioned between and interconnecting corresponding superimposed boxes of adjacent stacks, said spacers being substantially rectangular and having a pair of substantially parallel, spaced grooves formed therein disposed transversely of the top of said block and a pair of downwardly disposed, correspondingly spaced grooves formed in the bottom of said block, the grooves receiving the box cleats, individual boxes being supported at one end by a single spacer and at the opposite end by a pair of spaced spacers and in turn supporting a superimposed box by a pair of spaced spacers rested on the end of the box supported by a single spacer and at the opposite end by a single spacer rested upon the end of the box supported by double spacers.

6. A spacer adapted for use to maintain boxes arranged in stacks in vertically spaced relation and adjacent stacks in horizontally spaced relation, said boxes having cleats upwardly extended from the tops thereof adjacent to the ends, comprising a substantially rectangular block adapted to be horizontally positioned between corresponding pairs of superimposed boxes of adjacent stacks and to interconnect the stacks, said block having a thickened central portion with endwardly disposed shoulders adapted to fit snugly between the interstices of the stacks of boxes, endwardly extended portions of reduced thickness of lengths corresponding to the widths of the cleats and thickened terminal end portions providing inwardly disposed shoulders adapted to lock the cleats against movement away from each other when received against the portions of reduced thickness.

7. The combination of a plurality of boxes of substantially uniform rectangular shape arranged in stacks and the stacks arranged with the boxes in end-to-end relation in tiers, the individual boxes having cleats secured thereto disposed transversely of the tops of said boxes adjacent to the ends, and spacers adapted to hold the boxes in the stacks in vertically spaced relation and adjacent stacks in the tiers in horizontally spaced relation comprising elongated blocks positioned between corresponding superimposed boxes of adjacent stacks, each of said blocks having a pair of substantially parallel, spaced grooves formed transversely of the block fitted over the cleats of adjacent boxes in adjacent stacks, and a tension member secured to and extending between the top box and the bottom box in each stack compressing the boxes and interpositioned blocks between said top and bottom boxes with the grooves of the blocks seated on the cleats.

8. Spacing means adapted to support boxes and the like in vertically spaced relation in stacks and to maintain the stacks in horizontally spaced relation comprising a substantially horizontal rectangular block adapted to fit between and interconnect pairs of superimposed boxes of adjacent stacks, said blocks having a pair of substantially parallel, spaced, downwardly disposed grooves formed transversely therein and a pair of correspondingly spaced, substantially parallel transverse grooves formed upwardly disposed therein.

9. A spacer for use in maintaining boxes, or the like, arranged in stacks in vertically spaced relation and adjacent stacks in horizontally spaced relation, said boxes having transverse ledges at opposite ends thereof, comprising a substantially rectangular block adapted to be horizontally positioned between corresponding pairs of superimposed boxes of adjacent stacks and to interconnect the stacks, said block having a pair of substantially parallel, spaced grooves formed transversely therein adapted to receive the ledges of corresponding boxes of adjacent stacks and defining between the grooves a thickened central portion adapted to fit snugly between the interstices of the stacks of boxes.

10. A half-spacer of the character described adapted for use to maintain superimposed boxes, or the like, arranged in a stack in vertically spaced relation and the stack in horizontally spaced relation to an adjacent wall, said boxes having ledges upwardly extended from the tops thereof adjacent to the ends, comprising a substantially rectangular block adapted to be horizontally positioned between superimposed boxes and endwardly extended therefrom, said block having a thickened end portion adapted to fit snugly between the stack of boxes and the wall providing a shoulder inwardly disposed for ledge engagement, a central portion of reduced thickness of a length corresponding to the width of the ledges of the boxes, and a thickened opposite end providing an inwardly disposed shoulder disposed for ledge engagement.

11. Spacing means adapted to support boxes and the like in vertically spaced relation in a stack and to maintain the stack in horizontally spaced relation to a wall comprising a substantially horizontal rectangular block adapted to fit between superimposed boxes in the stack, said block having an upwardly disposed transverse groove and a downwardly disposed transverse groove formed therein in substantially vertical alignment.

12. In combination with a railway car, or the like, loaded with stacks of boxes of substantially uniform rectangular shape and size arranged in tiers with the boxes of adjacent stacks in spaced end to end relation, said boxes having transverse ledges adjacent to the ends thereof, spacing means interconnecting corresponding ledges of adjacent stacks in fixed spaced relation and positioned between corresponding boxes of said adjacent stacks, the spacing means having thickened central portions with endwardly disposed shoulders adapted to fit snugly between the interstices of the stack of boxes, endwardly extended portions of reduced thickness of lengths corresponding to the widths of the ledges, and thickened terminal end portions providing inwardly disposed shoulders adapted to lock the ledges against movement away from each other when received against the portions of reduced thickness.

CLYDE M. MARTIN.

REFERENCES CITED

The following references are of record in the file of this patent:

UNITED STATES PATENTS

| Number | Name | Date |
| --- | --- | --- |
| 1,442,259 | Eaton | Jan. 16, 1923 |
| 1,993,216 | Marshall | Mar. 5, 1935 |
| 2,059,390 | Pagel | Nov. 3, 1936 |
| 2,226,667 | Love | Dec. 31, 1940 |
| 2,248,119 | Reed et al. | July 8, 1941 |
| 2,341,088 | Ellis | Feb. 8, 1944 |